US008876972B2

(12) United States Patent
Hasegawa et al.

(10) Patent No.: US 8,876,972 B2
(45) Date of Patent: Nov. 4, 2014

(54) CRYSTALLIZATION DEVICE

(75) Inventors: Tomokazu Hasegawa, Ome (JP); Kensaku Hamada, Mino (JP); Masaru Sato, Tsukuba (JP); Moritoshi Motohara, Tsukuba (JP)

(73) Assignees: Rigaku Corporation, Akishima-shi, Tokyo (JP); Japan Aerospace Exploration Agency, Chofu-shi, Tokyo (JP)

( * ) Notice: Subject to any disclaimer, the term of this patent is extended or adjusted under 35 U.S.C. 154(b) by 1776 days.

(21) Appl. No.: 11/879,694

(22) Filed: Jul. 17, 2007

(65) Prior Publication Data

US 2008/0019888 A1 Jan. 24, 2008

(30) Foreign Application Priority Data

Jul. 18, 2006 (JP) ................. 2006-195590

(51) Int. Cl.
*C30B 29/58* (2006.01)
*B01D 9/00* (2006.01)

(52) U.S. Cl.
CPC ..................... *B01D 9/005* (2013.01)
USPC ................. 117/68; 117/69; 117/70; 117/925; 117/927

(58) Field of Classification Search
USPC ............. 117/68, 69, 70, 925, 927
See application file for complete search history.

(56) References Cited

U.S. PATENT DOCUMENTS

| | | | |
|---|---|---|---|
| 3,747,628 A * | 7/1973 | Holster et al. ................ 137/269 |
| 5,496,517 A * | 3/1996 | Pfost et al. ...................... 422/63 |
| 5,876,675 A * | 3/1999 | Kennedy ......................... 422/99 |
| 6,143,496 A * | 11/2000 | Brown et al. ...................... 435/6 |
| 6,251,343 B1 * | 6/2001 | Dubrow et al. ............... 422/102 |
| 6,306,659 B1 * | 10/2001 | Parce et al. ...................... 436/47 |
| 6,485,690 B1 * | 11/2002 | Pfost et al. ..................... 422/102 |
| 6,503,757 B1 * | 1/2003 | Chow .............................. 436/43 |
| 6,582,969 B1 * | 6/2003 | Wagner et al. ................ 436/518 |
| 6,719,840 B2 * | 4/2004 | David et al. ................ 422/245.1 |
| 6,929,030 B2 * | 8/2005 | Unger et al. .................. 137/883 |
| 6,977,145 B2 * | 12/2005 | Fouillet et al. .................... 435/6 |

(Continued)

FOREIGN PATENT DOCUMENTS

JP 06-321700 11/1994

OTHER PUBLICATIONS

Journal of Synchrotron Radiation, vol. 11, Part I (Jan. 2004), International Symposium on Diffraction Structural Biology (ISDSB03), Epochal Tsukuba, Tsukuba, Japan, May 28-Jun. 2, 2003—pp. 45-48.

*Primary Examiner* — Bob M Kunemund
(74) *Attorney, Agent, or Firm* — Holtz, Holtz, Goodman & Chick PC

(57) ABSTRACT

A crystallization device is for protein crystallization with a small amount of a sample in the liquid to liquid diffusion method. It is easy to fill the device with protein solution and precipitant solution and easy to pick up grown crystals from the device. The device comprises a channel plate made of polydimethylsiloxane (PDMS) and the first and second cover sheets made of polyethylene terephthalate. The channel plate includes at least one elongated channel having one side which extends in the longitudinal direction of the channel, the one side being exposed at the bottom surface of the channel plate. The channel has both ends which communicate with a protein solution inlet and a precipitant solution inlet respectively. The channel also communicates midway with a gel inlet and a vent hole. When picking up grown crystals from the device, the second cover sheet is cut off with a cutter knife so that the channel is exposed.

24 Claims, 9 Drawing Sheets

(56) References Cited

U.S. PATENT DOCUMENTS

| | | | |
|---|---|---|---|
| 2002/0037499 A1* | 3/2002 | Quake et al. | 435/5 |
| 2002/0064885 A1* | 5/2002 | Bedingham et al. | 436/174 |
| 2003/0027225 A1* | 2/2003 | Wada et al. | 435/7.21 |
| 2004/0141887 A1* | 7/2004 | Mainquist et al. | 422/102 |
| 2005/0019794 A1* | 1/2005 | Nassef et al. | 435/6 |
| 2005/0201901 A1* | 9/2005 | Grossman et al. | 422/100 |
| 2008/0019888 A1* | 1/2008 | Hasegawa et al. | 422/253 |
| 2009/0264632 A1* | 10/2009 | Sommer | 530/418 |

* cited by examiner

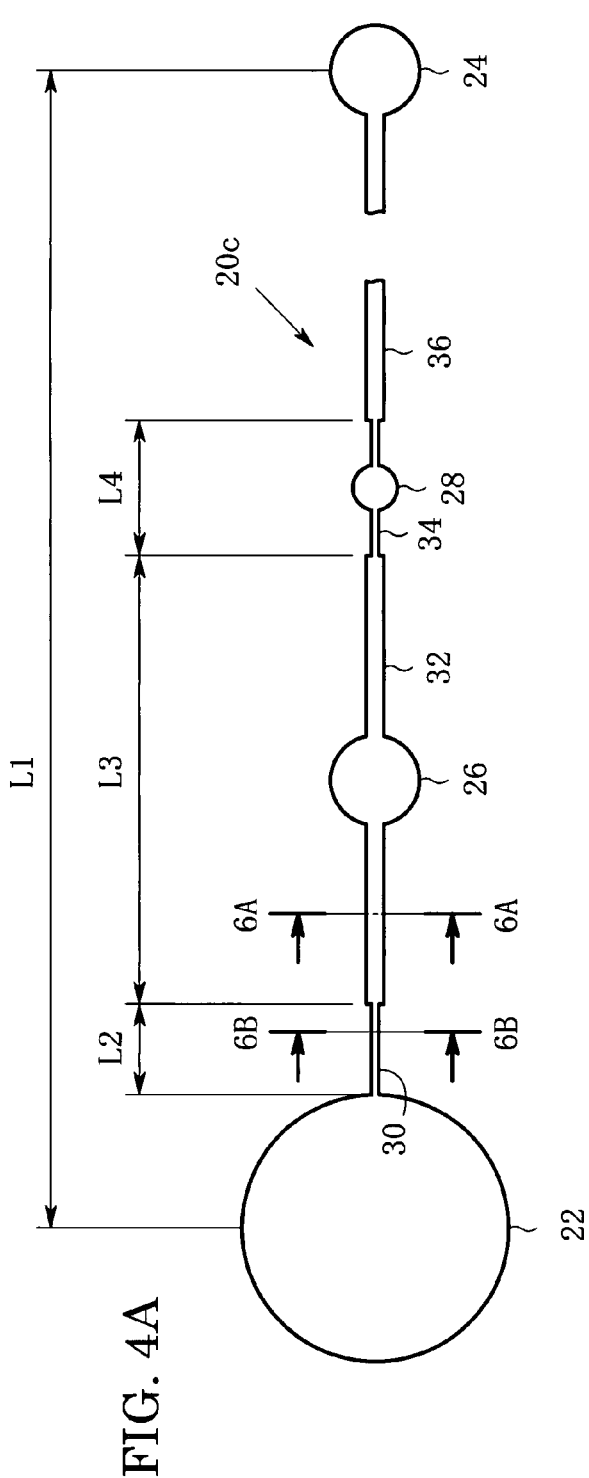
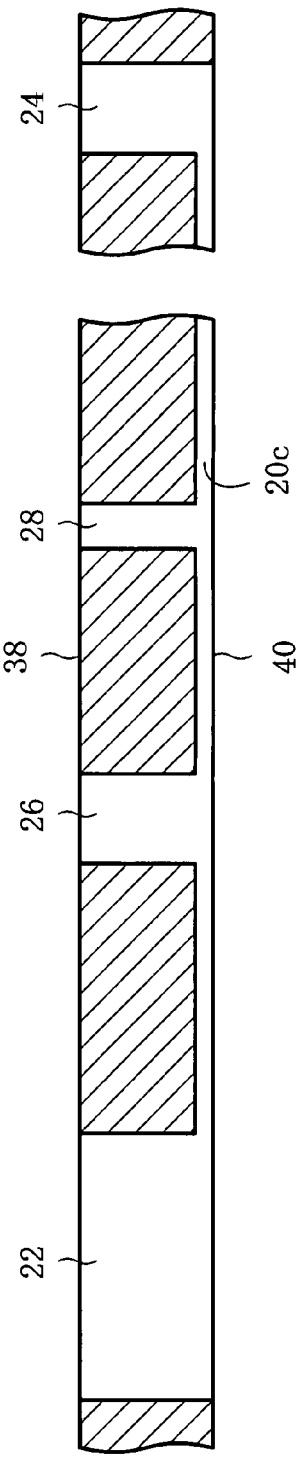
FIG. 4A
FIG. 4B

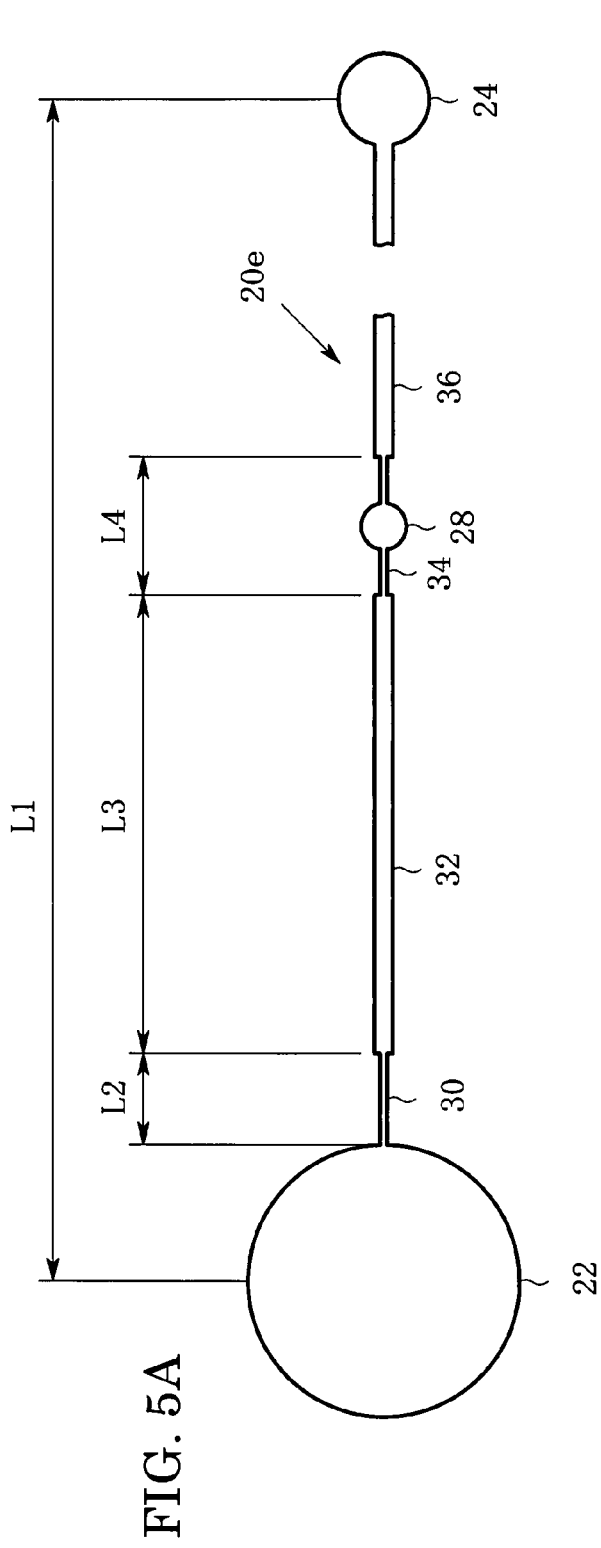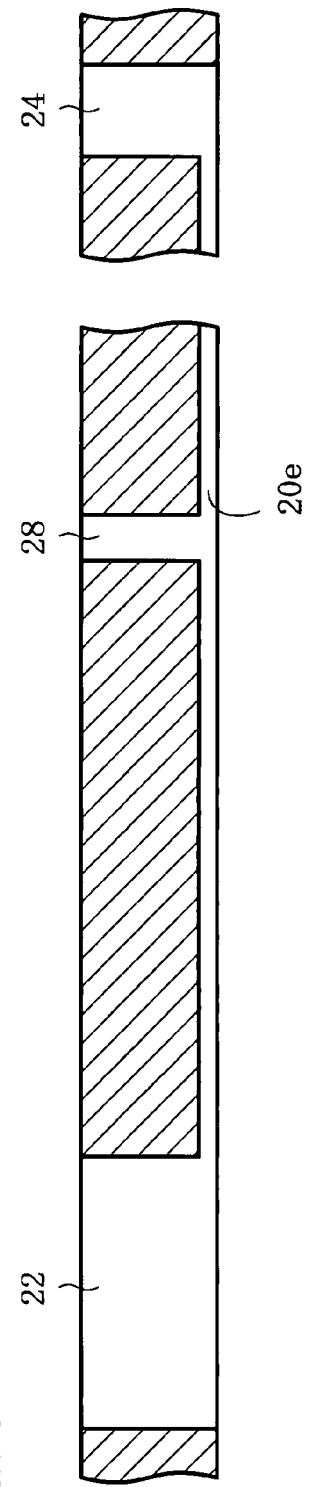
FIG. 5A
FIG. 5B

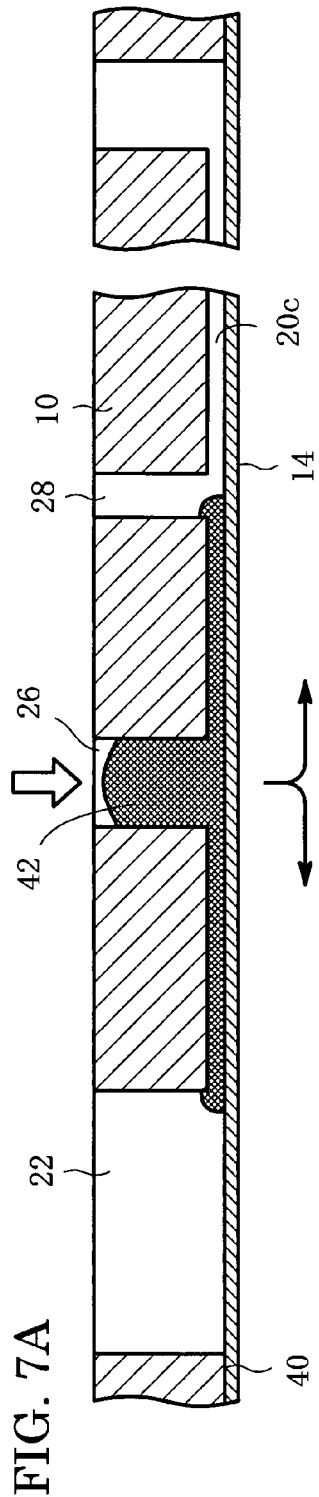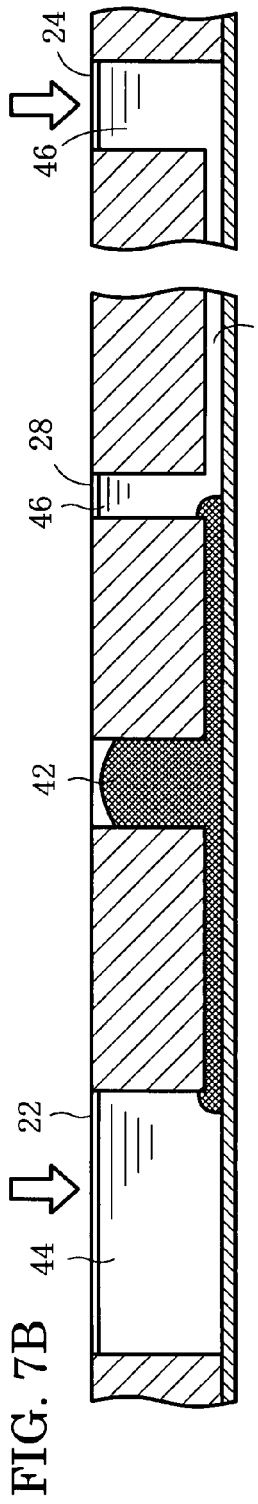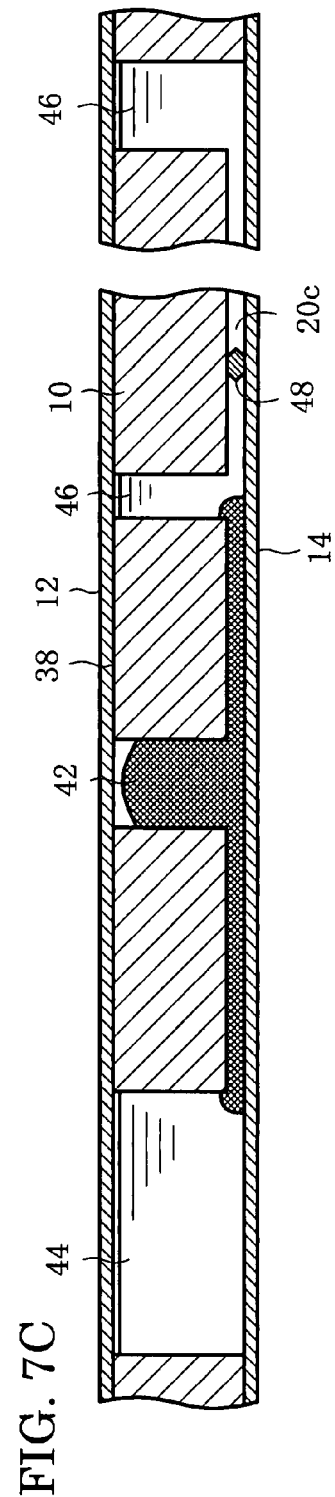

FIG. 9

| Experiment number | Channel number | Channel width (μm) | Gel filling | Protein | Set-up | Days | | | |
|---|---|---|---|---|---|---|---|---|---|
| | | | | | | 1 | 2 | 6 | 13 |
| 1 | 1 | 200 | without | Lysozyme | ○ | C | C | C | C |
| 2 | 2 | 200 | without | Thaumatin | ○ | | | C | C |
| 3 | 3 | 200 | with | Lysozyme | ○ | | | | C |
| 4 | 4 | 200 | with | Thaumatin | ○ | | | C | C |
| 5 | 1 | 100 | without | Lysozyme | ○ | | C | C | C |
| 6 | 2 | 100 | without | Thaumatin | ○ | | | C | C |
| 7 | 3 | 100 | with | Lysozyme | ○ | | | | |
| 8 | 4 | 100 | with | Thaumatin | ○ | | | | |
| 9 | 1 | 50 | without | Lysozyme | ○ | | A | A | C |
| 10 | 2 | 50 | without | Thaumatin | ○ | | C | C | C |
| 11 | 3 | 50 | with | Lysozyme | ○ | | | | C |
| 12 | 4 | 50 | with | Thaumatin | ○ | | | | |
| 13 | 1 | 20 | without | Lysozyme | ○ | | A | A | C |
| 14 | 2 | 20 | without | Thaumatin | ○ | | | | C |

CRYSTALLIZATION DEVICE

BACKGROUND OF THE INVENTION

The present invention relates to a crystallization device used for making crystals in the liquid to liquid diffusion method. The liquid to liquid diffusion method is known as one of methods for protein crystallization. The liquid to liquid diffusion method is so operated that: protein solution and precipitant solution are in contact with each other to diffuse into each other at the free boundary between them; and the protein solution partly becomes a supersaturated condition so that the protein is crystallized. When performing experimentally screening of the conditions for the protein crystallization in the liquid to liquid diffusion method, it is preferable to perform experiments under many conditions at the same time with a small amount of a sample. A device suitable for such experiments is known as a crystallization plate which is disclosed in U.S. Patent Publication No. 2005/0201901 A1 which is referred to as the first publication hereinafter. The present invention relates to such a crystallization plate.

The crystallization plate in the first publication makes it possible to perform screening for many crystallization conditions at the same time with a small amount of a sample. The crystallization plate has many elongated channels inside which protein solution and precipitant solution are in contact with each other. The crystallization plate has three valves: an interface valve between a protein solution channel and a precipitant solution channel; a containment valve for protein solution supply disposed near a protein solution supply port; and another containment valve for precipitant solution supply disposed near a precipitant solution supply port. These valves are controlled to supply the protein solution and the precipitant solution and to launch counter diffusion between the protein solution and the precipitant solution. The valves are operated by a gas pressure and thus the crystallization plate requires a special device for the gas pressure. After the start of the diffusion, the interface valve is closed after the predetermined lapse of time, and then water vaporization from the protein solution goes underway to cause a variation in density of the protein solution, so that crystals are precipitated.

In addition, a gel counter diffusion method is known as one kind of the liquid to liquid diffusion method and is disclosed in J. Synchrotron Rad. (2004) 11, 45-48 "A simplified counter diffusion method combined with a 1-D simulation program for optimizing crystallization conditions" (the second publication) and Japanese Patent Publication No. 6-321700 A (1994) (the third publication). The gel counter diffusion method is so operated that: protein solution and precipitant solution are arranged with gel between them; and the protein solution and the precipitant solution diffuse into each other through the gel so that the protein is crystallized. The present invention relates to the gel counter diffusion method too.

The crystallization plate for the liquid to liquid diffusion method and the crystallization device for the gel counter diffusion method both have a problem in picking up grown crystals from the device. The conventional crystallization plate disclosed in the first publication also has a problem of requiring the special pressure device for pressure filling of the protein solution and the precipitant solution.

SUMMARY OF THE INVENTION

It is an object of the present invention to provide a crystallization device with which crystallization is performed with a small amount of a sample in the liquid to liquid diffusion method and it is easy to pick up grown crystals.

It is another object of the present invention to provide a crystallization device with which crystallization is performed with a small amount of a sample in the liquid to liquid diffusion method and it is easy to discharge air from the channel to make it easy to perform a filling operation.

A crystallization device according to the present invention is for making crystals of a target material from a target material solution which contains the target material to be crystallized. The device comprises a channel plate, at least one first cover sheet and at least one second cover sheet. The channel plate includes: a) a flat body having a first surface and a second surface; b) at least one elongated channel formed in the body and having one side which extends in a longitudinal direction of the channel, the one side being exposed at the second surface; c) at least one target material solution inlet formed in the body and having one end which opens at the first surface and another end which communicates with a first end of the channel; d) at least one crystallizing solution inlet formed in the body and having one end which opens at the first surface and another end which communicates with a second end of the channel; e) at least one vent hole formed in the body and having one end which opens at the first surface and another end which communicates with the channel at a point between the first end and the second end of the channel; and f) at least one gel inlet formed in the body and having one end which opens at the first surface and another end which communicates with the channel at a point between the second end of the channel and the vent hole. The first cover sheet covers the first surface so as to achieve an airtight seal over at least an opening of the target material solution inlet, an opening of the crystallizing solution inlet, an opening of the vent hole and an opening of the gel inlet. The second cover sheet is transparent and flexible and covers the second surface so as to achieve an airtight seal over at least an opening of the one side of the channel.

The crystallization device according to the present invention may not include the gel inlet. Further, the crystallization device according to the present invention may not include both the gel inlet and the vent hole.

The body may be preferably made of polydimethylsiloxane (PDMS). The second cover sheet may be preferably made of one selected from a group consisting of polyethylene terephthalate, polyimide and polytetrafluoroethylene. With the second cover sheet made of such materials, the first cover sheet may be made of the same material too.

The crystallization device according to the present invention is most suitable for especially protein crystallization with a small amount of a sample in the liquid to liquid diffusion method, but it is usable for crystallization of other materials in the liquid to liquid diffusion method.

The present invention has an advantage that it is easy to pick up grown crystals from the device in the case of making crystals with a small amount of a sample in the liquid to liquid diffusion method. In addition, in the case of having the vent hole, air is easily discharged from the channel in supplying the target material solution, the crystallizing solution and the gel, so that the filling operation for the protein solution and the crystallizing solution is performed successfully without pressure.

BRIEF DESCRIPTION OF THE DRAWINGS

FIG. 4A is a plan view showing the third channel as viewed from the bottom side of the channel plate;

FIG. 4B is a sectional view of the third channel;

FIG. 5A is a plan view showing the fifth channel as viewed from the bottom side of the channel plate;

FIG. 5B is a sectional view of the fifth channel;

FIGS. 7a to 7c are sectional views for explaining how to use the crystallization device;

FIG. 9 shows a table indicating experimental results of the protein crystallization.

DETAILED DESCRIPTION OF THE PREFERRED EMBODIMENTS

Figure 1:
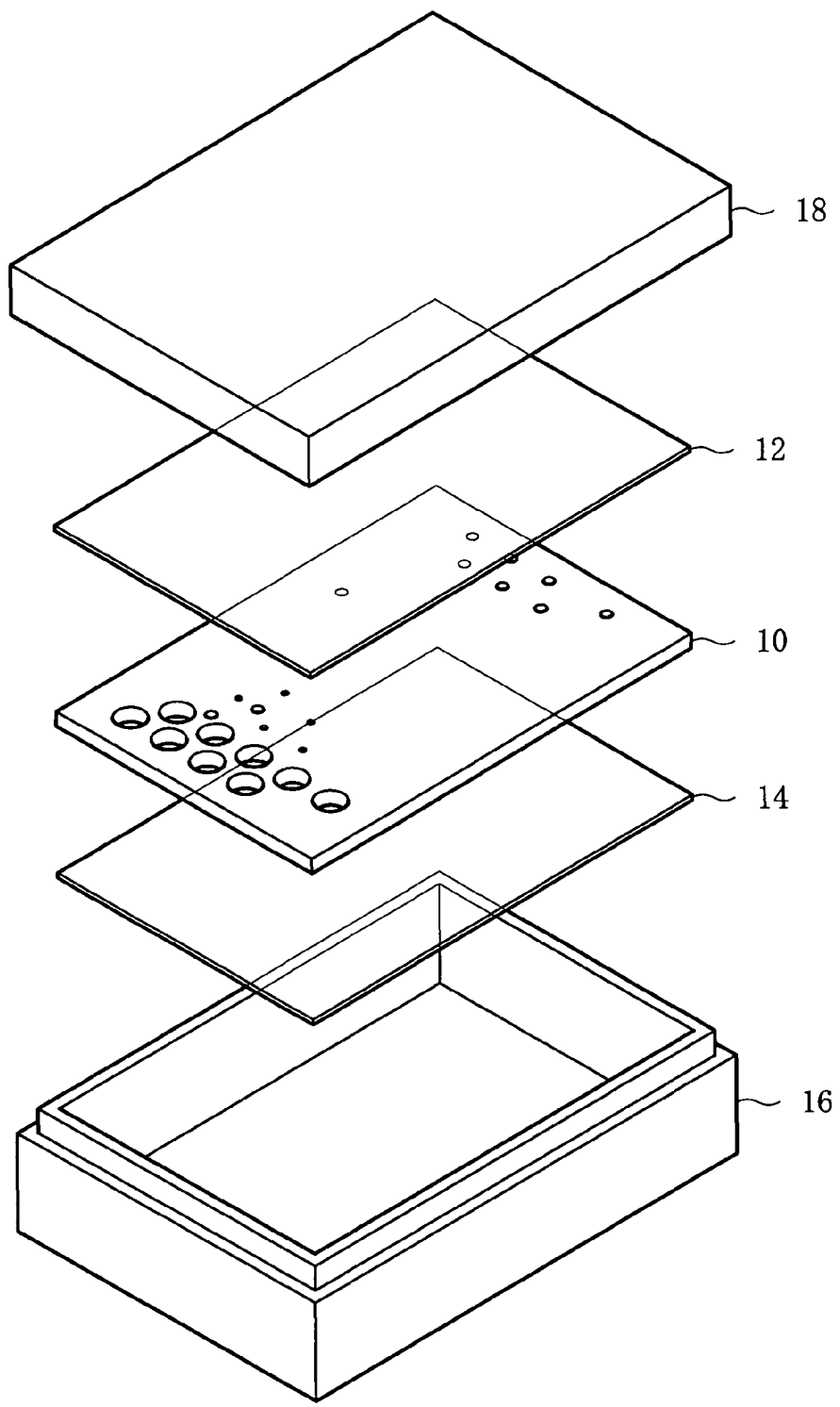
FIG. 1 is an exploded perspective view of one embodiment of the crystallization device according to the present invention.

Embodiments of the present invention will now be described in detail below with reference to the drawings. Referring to FIG. 1 which is an exploded perspective view of one embodiment of the crystallization device according to the present invention, the crystallization device is for making crystals of a target material from a target material solution (which contains the target material to be crystallized) in the liquid to liquid diffusion method. In the following description, protein crystallization is explained as one embodiment. The crystallization device consists of a channel plate 10, the first cover sheet 12, the second cover sheet 14, a casing 16 and a casing lid 18. Explaining briefly how to use the crystallization device, the second cover sheet 14 is attached to the bottom surface (second surface) of the channel plate 10 and thereafter each channel of the channel plate is filled with protein solution as the target material solution, precipitant solution as the crystallizing solution and gel through a protein solution inlet, a precipitant solution inlet and a gel inlet respectively. Then, the first cover sheet 12 is attached to the top surface of the channel plate 10. The thus assembled channel plate 10 sandwiched between the two cover sheets 12 and 14 is disposed inside the casing 16 and thereafter the casing lid 18 is capped over the casing 16. Keeping the condition with the predetermined lapse of time, protein is crystallized inside the channels of the channel plate 10.

The casing 16 is rectangular in plane shape and is made of a transparent, hard plastic (for example polystyrene). The casing lid 18 also is rectangular in plane shape and is made of the same material as the casing 16.

The channel plate 10 has a flat body which is formed with: channels for the protein solution, the precipitant solution and the gel; inlets for the protein solution, the precipitant solution and the gel; and vent holes. The body of the channel plate 10 is rectangular in plane shape with a size of 90 mm times 60 mm and a thickness of about 2 to 3 mm. The body of the channel plate 10 is made of polydimethylsiloxane (PDMS) which is transparent silicone elastomer.

The first and second cover sheets 12 and 14 are rectangular in plane shape with the same sizes as the channel plate 10 and made of polyethylene terephthalate. Each of the cover sheets is a transparent, flexible sheet with a thickness of 0.1 to 0.15 mm.

The channel plate 10, the two cover sheets 12 and 14, the casing 16 and the casing lid 18 all are transparent for a visible light and thus the inside of the channel plate 10 can be observed from the outside.

Figure 2:
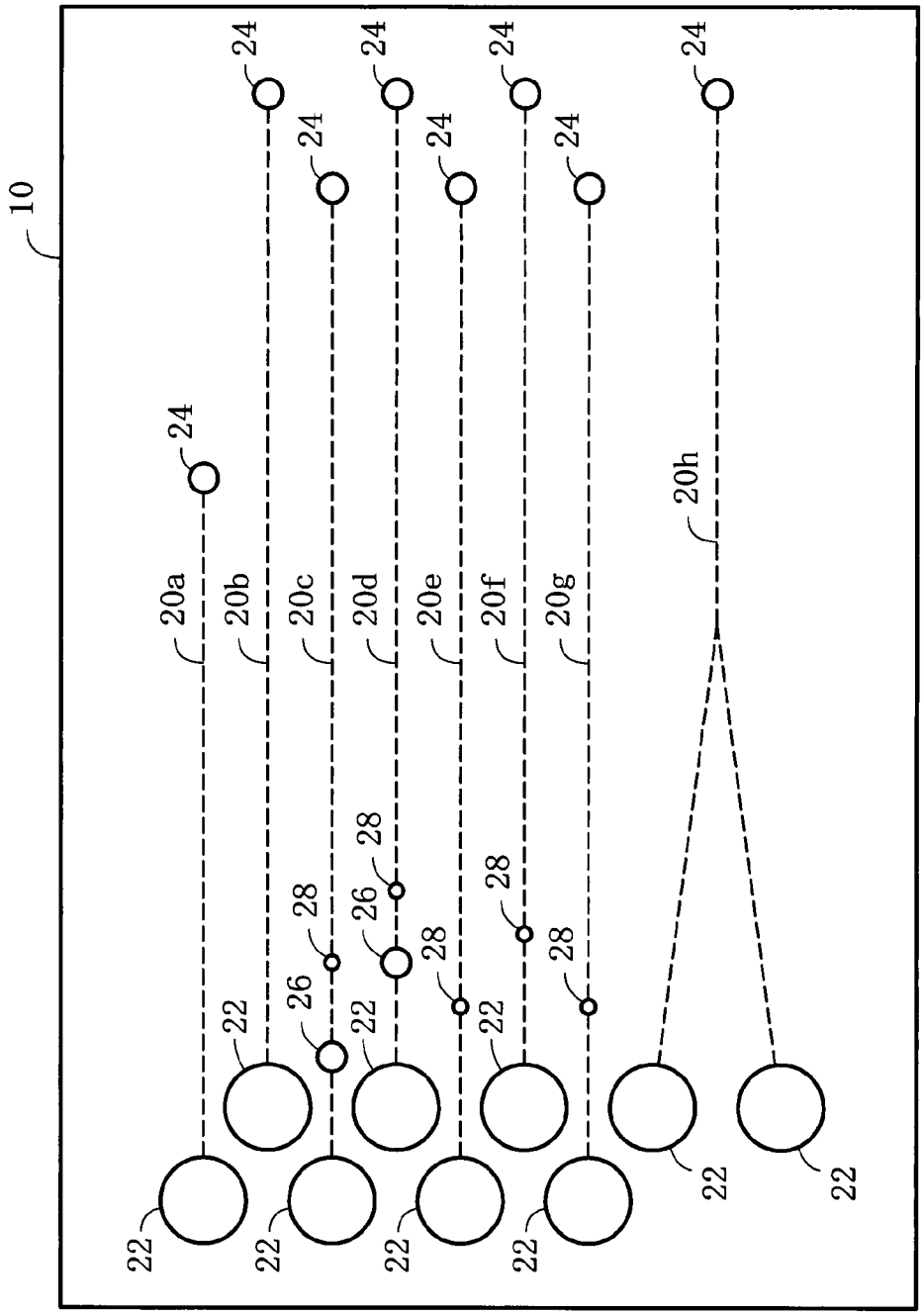
FIG. 2 is a plan view showing the top surface (the first surface) of the channel plate.

Referring to FIG. 2 which is a plan view showing the top surface (first surface) of the channel plate 10, eight channels 20a to 20h are depicted by broken lines, the channels being formed to be exposed at the bottom surface (second surface) of the channel plate 10. The eight channels will be denoted by a single reference number 20 in the case of explaining them in disregard of the difference among the channels. One end (first end) of the channel 20 communicates with a protein solution inlet 24 and the other end (second end) of the channel 20 communicates with a precipitant solution inlet 22. The protein solution inlet 24 and the precipitant solution inlet 22 are open at the top surface of the channel plate 10, the openings being used for supplying the protein solution and the precipitant solution.

The channel plate 10 is formed with the eight channels 20a to 20h as described above and each of the channels has the first end communicating with the protein solution inlet 24 and the second end communicating with the precipitant solution inlet 22. The features of the eight channels will be explained below. The first and the second channels 20a and 20b each has no other inlets between the protein solution inlet 24 and the precipitant solution inlet 22. The difference between the first and the second channels 20a and 20b resides in the lengths of the channels. The length of the first channel 20a (the distance between the center of the protein solution inlet 24 and the center of the precipitant solution inlet 22) is 50 mm, whereas the length of the second channel 20b is 70 mm. The third and the fourth channels 20c and 20d each has a gel inlet 26 and a vent hole 28 midway between the both ends. The difference between the third and the fourth channels 20c and 20d resides in the positions of the vent holes 28. The vent hole 28 of the fourth channel 20d is positioned closer to the gel inlet 26 than the third channel 20c. The fifth and the sixth channels 20e and 20f each has only a vent hole 28 midway between the both ends. The difference between the fifth and the sixth channels 20e and 20f resides in the positions of the vent holes 28. The position of the vent hole 28 of the sixth channel 20f is positioned closer to the precipitant solution inlet 22 than the fifth channel 20e. The seventh channel 20g is similar to the fifth channel 20e and the difference between them will be described later. The eighth channel 20h is branched midway into two passages each of which communicates with a precipitant solution inlet 22.

The protein solution inlet 24 is 2 mm in diameter, the precipitant solution inlet 22 is 6 mm in diameter, the gel inlet 26 is 2 mm in diameter, and the vent hole 28 is 0.5 mm in diameter.

Four kinds of channel plates of the type shown in FIG. 2 were made with the difference in channel width: 200 micrometers, 100 micrometers, 50 micrometers and 20 micrometers. The channel depth is the same as the channel width. In each of the channel plates, the eight channels described above basically have the same channel widths in the common channel plate.

The shapes and the sizes of the eight channels will now be described in detail with taking the channel plate of 200 micrometers in channel width as an example. First, each of the first and the second channels 20a and 20b is 200 micrometers in channel width and is 200 micrometers in channel depth.

Next, the third channel 20c will be explained. FIG. 4A is a plan view showing the third channel 20c as viewed from the bottom side of the channel plate, and FIG. 4B is a sectional view taken along the centerline of the third channel 20c. The both ends of the channel 20c communicate with the protein solution inlet 24 and the precipitant solution inlet 22 respectively. The channel 20c also communicates with the gel inlet 26 and the vent hole 28 midway between the both ends. The vent hole 28 is positioned between the gel inlet 26 and the protein solution inlet 24. The third channel 20c is used for protein crystallization in the gel counter diffusion method. As shown in FIG. 4B, the protein solution inlet 24, the precipitant solution inlet 22, the gel inlet 26 and the vent hole 28 each has one end (top end) which is open at the top surface 38 (first surface) of the channel plate. The other end (bottom end) of each of the inlets 22, 24 and 26 and the vent hole 28 communicates with the channel 20c. The channel 20c has one side (bottom side) extending in the longitudinal direction of the channel, the one side being open at the bottom surface 40 (second surface) of the channel plate.

The third channel 20c consists of broader passages having the standard channel width of the channel plate and narrower passages having channel widths narrower than the broader passage. It should be noted that the terms of "broader" and "narrower" are relative expressions. Explaining the passage arrangement from the side of the precipitant solution inlet 22, the first narrower passage 30, the first broader passage 32, the second narrower passage 34 and the second broader passage 36 are arranged sequentially to communicate with one another. The longitudinal center of the first broader passage 32 communicates with the gel inlet 26, and the longitudinal center of the second narrower passage 34 communicates with the vent hole 28. The narrower passages 30 and 34 are provided for retarding the speed with which the protein solution advances inside the channel, but the narrower passages may be replaced by the standard broader passages so that the channel has a uniform width.

Figure 6A:
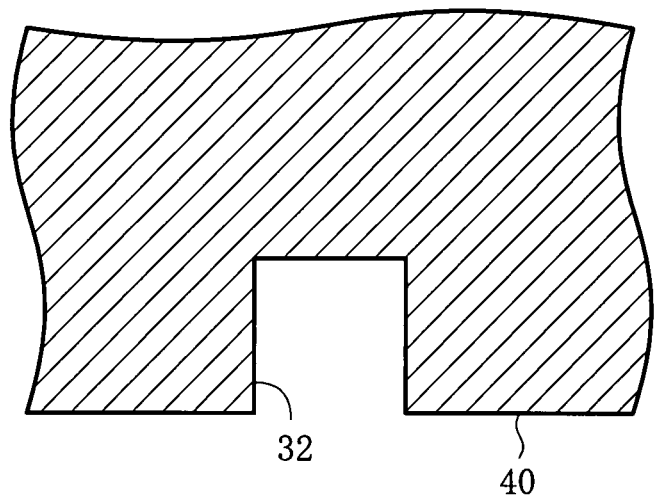
FIG. 6A is a sectional view taken along the line 6A-6A in FIG. 4A.
Figure 6B:
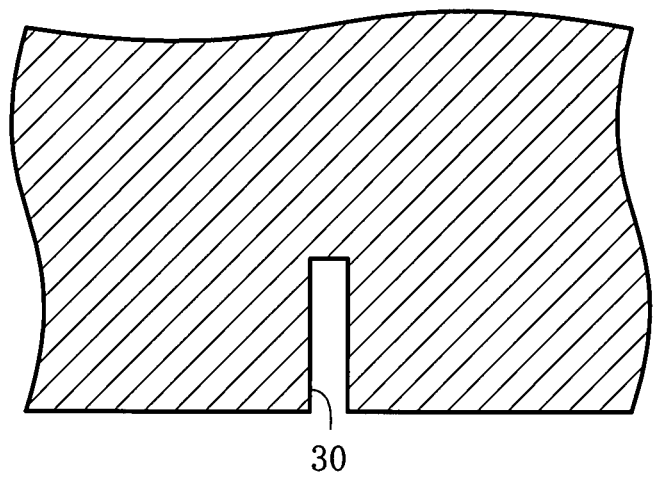
FIG. 6B is a sectional view taken along the line 6B-6B in FIG. 4A.

FIG. 6A is a sectional view taken along the line 6A-6A in FIG. 4A, showing the sectional shape of the first broader passage 32. The first broader passage 32 is 200 micrometers in depth and 200 micrometers in width too (the standard channel width of this channel plate). It is well understood from FIG. 6A that one side (bottom side) of the passage 32 is open at the bottom surface 40 (second surface) of the channel plate. FIG. 6B is a sectional view taken along the line 6B-6B in FIG. 4A, showing the sectional shape of the first narrower passage 30. The first narrower passage 30 is 200 micrometers in depth and 50 micrometers in width. The narrower and broader passages have the same depths but different widths. Turning to FIG. 4A, the second broader passage 36 has the same sectional shape as the first broader passage 32, and the second narrower passage 34 has the same sectional shape as the first narrower passage 30.

Referring to FIG. 4A, the distance L1 between the center of the protein solution inlet 24 and the center of the precipitant solution inlet 22 is 70 mm. The length L2 of the first narrower passage 30 is 2 mm, the length L3 of the first broader passage 32 is 10 mm, and the length L4 of the second narrower passage 34 is 3 mm. Accordingly, the length of the second broader passage 36 is 51 mm, which is longer than other passages 30, 32 and 34, noting that the second broader passage 36 is depicted with a central part omitted in FIG. 4A.

Figure 3:
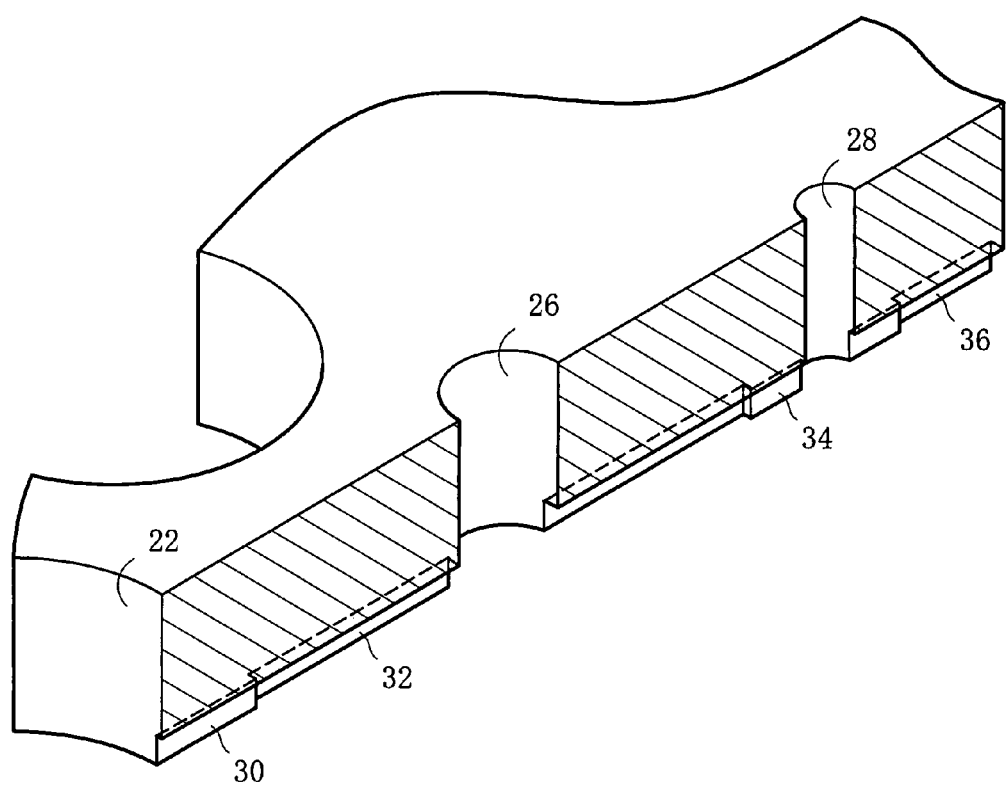
FIG. 3 is a partial perspective view of the third channel.

FIG. 3 is a partial perspective view of the third channel 20c, showing a section taken along the centerline of the channel. Explaining the passage arrangement from the side of the precipitant solution inlet 22, the first narrower passage 30, the first broader passage 32, the second narrower passage 34 and the second broader passage 36 are arranged sequentially to communicate with one another. The longitudinal center of the first broader passage 32 communicates with the gel inlet 26, and the longitudinal center of the second narrower passage 34 communicates with the vent hole 28.

Turning to FIG. 2, the fourth channel 20d will now be described. The fourth channel 20d is the same as the third channel 20c except that the vent hole 28 of the fourth channel 20d is positioned closer to the gel inlet 26 than the third channel 20c.

Next, the fifth channel 20e will be described. FIG. 5A is a plan view showing the fifth channel 20e as viewed from the bottom side of the channel plate, and FIG. 5B is a sectional view taken along the centerline of the fifth channel 20e. The both ends of the channel 20e communicate with the protein solution inlet 24 and the precipitant solution inlet 22 respectively. The channel 20e also communicates with the vent hole 28 midway between the both ends. The fifth channel 20e is the same as the third channel 20c except that the fifth channel 20e has no gel inlet. The fifth channel 20e is used for protein crystallization in the counter diffusion method without gel. The broader passages are 200 micrometers in width, and the narrower passages are 50 micrometers in width.

Turning to FIG. 2, the sixth channel 20f is the same as the fifth channel 20e except that the vent hole 28 of the sixth channel 20f is positioned closer to the precipitant solution inlet 22 than the fifth channel 20e.

The seventh channel 20g is 200 micrometers in width and 200 micrometers in depth. The seventh channel 20g is the same as the fifth channel 20e except that the seventh channel 20g has a uniform width, that is, the passage is not narrowed near the vent hole 28.

The eighth channel 20h is 200 micrometers in width and 200 micrometers in depth, and branches midway into two passages.

The above description is for the channel plate with the standard channel width of 200 micrometers. If considering the channel plate with the standard width of 100, 50 and 20 micrometers, the term "200 micrometers" appearing in the above description should be replaced by 100, 50 and 20 micrometers respectively. It should be noted, however, that the narrower passages (which reside in the channels from the third channel 20c to the sixth channel 20f) have special widths dependent on the standard channel width as described below. In the case of the channel plate with the standard channel width of 100 micrometers, the narrower passages are 50 micrometers in width. In the case of the channel plate with the standard channel width of 50 micrometers, the narrower passages are 20 micrometers in width. In the case of the channel plate with the standard channel width of 20 micrometers, the narrower passages are 10 micrometers in width.

The elongated channels may be formed inside the channel plate with the use of the lithography technique with photoresist.

FIGS. 7A to 7C are sectional views for explaining how to use the crystallization device, showing the protein crystallization process in the gel counter diffusion method with the use of the third channel 20c, which is one of the eight kinds of channels shown in FIG. 2. First, as shown in FIG. 7A, the second cover sheet 14 is attached to the bottom surface 40 (second surface) of the channel plate 10. The channel plate 10 is made of elastic PDMS and the second cover sheet 14 is made of flexible polyethylene terephthalate, and therefore only pushing the second cover sheet 14 against the bottom surface 40 of the channel plate 10 achieves an airtight seal between the channel and the cover sheet 40. Next, gel 42 is introduced into the gel inlet 26 with a micro pipette. The gel 42 extends from the gel inlet 26 into the inside of the channel 20c. The gel 42 is introduced with a limited amount until the gel 42 is first observed at the precipitant solution inlet 22 and the vent hole 28.

Next, as shown in FIG. 7B, precipitant solution 44 is introduced into the precipitant solution inlet 22 with the micro pipette. The precipitant solution 44 is introduced with a limited amount until the level of the precipitant solution 44 reaches near the top edge of the precipitant solution inlet 22. Next, protein solution 46 is introduced into the protein solution inlet 24 with the micro pipette. The protein solution 46 advances inside the elongated channel 20c and reaches the vent hole 28 and finally moves upward inside the vent hole 28. The protein solution 46 is introduced with a limited amount until the level of the protein solution 46 reaches near the top edges of the protein solution inlet 24 and the vent hole 28. If there is no vent hole 28, there is the danger of air remainder between the gel 42 which has been introduced and the protein solution 46 which is being introduced, especially for the channel 20c having a narrower width. If there is the vent hole 28, there is no danger of the air remainder, the air being easily discharged.

After completion of the introduction of the precipitant solution 44 and the protein solution 46, the first cover sheet 12 is attached to the top surface 38 (first surface) of the channel plate 10 as shown in FIG. 7C. Since the first cover sheet 12 is made of flexible polyethylene terephthalate like the second cover sheet 14, only pushing the first cover sheet 12 against the top surface 38 of the channel plate 10 achieves an airtight seal between the cover sheet 12 and the opening of the protein solution inlet 24, the opening of the precipitant solution inlet 22, the opening of the gel inlet 26 and the opening of the vent hole 28. The polyethylene terephthalate, which is the material of the cover sheets 12 and 14, has a low water permeability and thus no crystallization caused by water vaporization is expected. It is believed that the protein crystallization is accomplished by the supersaturation in protein density of the protein solution 46 in the process of diffusion of the precipitant solution 44 into the protein solution 46 and diffusion of the protein solution 46 into the precipitant solution 44 through the gel 42.

As shown in FIG. 1, the channel plate 10 sandwiched between the two cover sheets 12 and 14 is housed in the casing 16 and thereafter the casing lid 18 is capped over the casing 16. The casing 16 containing the channel plate 10 therein is set inside the constant temperature bath and is kept stationary for the predetermined time, awaiting the protein crystallization. The casing 16, the casing lid 18, the channel plate 10 and the two cover sheets 12 and 14 are all transparent and thus the status of the protein crystallization can be observed from the outside. When recognizing the formation of a crystal with a sufficient size, the crystal may be picked up from the channel with a method described below. FIG. 7C depicts schematically a protein crystal 48 which has been precipitated inside the channel 20c.

The crystallization device according to the present invention is easily set up only with the introduction of the gel, the precipitant solution and the protein solution into the gel inlet, the precipitant solution inlet and the protein solution inlet respectively, and therefore the set-up operation is simple and the repeatability is good even with a small amount of a sample. In the case of having the vent hole, the introducing operation for the gel and the protein solution is performed without pressure. An amount of a sample per channel (i.e., per condition) required is very small, and thus experiments are possible even with at least 0.1 microliter or less for example.

In the case without the gel, crystallization experiments may be performed with the use of any one the first channel 20a, the second channel 20b, and the fifth channel 20e to the eighth channel 20h. In such a case, the precipitant solution is first introduced into the channel partway, and thereafter the protein solution is introduced into the channel so as to be in direct contact with the precipitant solution.

Figure 8:
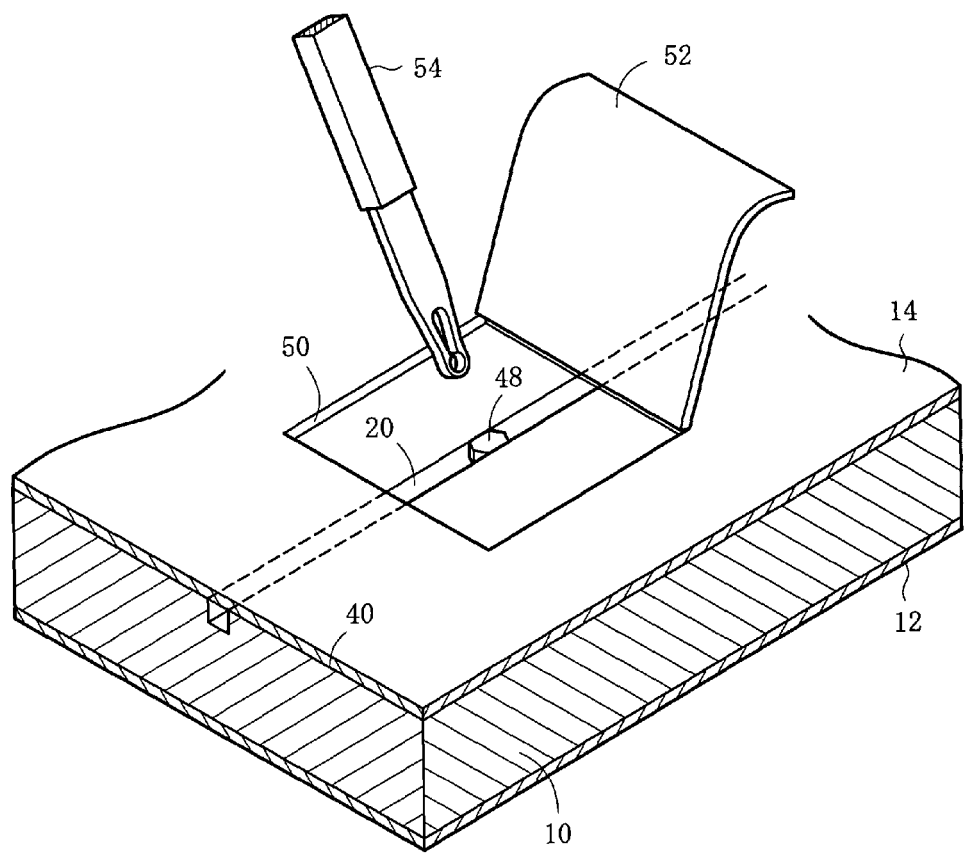
FIG. 8 is a perspective view showing how to pick up grown protein crystals from the device.

FIG. 8 is a perspective view showing how to pick up grown protein crystals from the device, the cover sheet having been cut off partly. The channel plate 10 containing a grown crystal 48 inside the channel 20 is taken out from the casing as it is kept sandwiched between the two cover sheets 12 and 14, and thereafter it is turned upside down so that the second cover sheet 14 comes to the top. Then, the cover sheet 14 is cut in with a cutter knife (not shown) to have a cut line 50 around the crystal 48, noting that the cut line 50 should reach in depth the channel plate 10 made of PDMS. Thereafter, a segment 52 of the second cover sheet 14 surrounded by the cut line 50 is peeled off from the bottom surface 40 of the channel plate 10, so that the channel 20 of the channel plate 10 is exposed. The crystal 48 is then picked up with a pick-up tool 54. As just described, since the second cover sheet 14 is a transparent, flexible sheet, it is cut off at any desired point so as to expose the crystal inside the channel, making it easy to pick up the crystal. The crystal picked up may be analyzed in the X-ray crystal structure analysis. The channel plate 10 is usually disposable and thus scratching it with a cutter knife is no problem.

Experimental conditions for the actual crystallization will now be described. The protein solutions prepared were a Lysozyme solution and a Thaumatin solution. The Lysozyme solution contains HEW-Lysozyme (purchased from Wako Pure Chemical Industries) with 80 mg/ml in density which is dissolved in 50 mM sodium acetate (purchased from Wako Pure Chemical Industries) with pH 4.7. The precipitant solution for the Lysozyme is 10-percent (w/v) Sodium Chloride (NaCl) (purchased from Wako Pure Chemical Industries) dissolved in 50 mM sodium acetate (purchased from Wako Pure Chemical Industries) with pH 4.7.

The Thaumatin solution contains Thaumatin (purchased from Sigma-Aldrich) with 20 mg/ml in density. The precipitant solution for the Thaumatin is CrystalScreen 1-29 [0.8 M Potassium Sodium Tartrate tetrahydrate, 0.1M HEPES-Na (4-(2-Hydroxyethyl)piperazine-1-ethenesulfonic acid sodium salt), pH 7.5] (purchased from Hampton Research).

The gel contains 1-percent (w/v) Agarose (purchased from Wako Pure Chemical Industries) and 0.04-percent Sodium Azide ($NaN_3$) (purchased from Wako Pure Chemical Industries).

FIG. 9 shows a table indicating experimental results of the protein crystallization. Lysozyme and Thaumatin crystallizations were carried out under the conditions described below. The four kinds of the channel plates with different channel widths were used, and the four channels from the first channel 20a to the fourth channel 20d shown in FIG. 2 were used for each channel plate. Experiment numbers 1 to 4 are for the channel plate with 200 micrometers in channel width, experiment numbers 5 to 8 are for the channel plate with 100 micrometers in channel width, experiment numbers 9 to 12 are for the channel plate with 50 micrometers in channel width, and experiment numbers 13 and 14 are for the channel plate with 20 micrometers in channel width.

The column "Set-up" in the table indicates whether or not the gel, the protein solution and the precipitant solution are introduced successfully into the channel, the white circle representing a successful filling operation.

The column "Days" indicates whether or not crystals are observed in the channel at the lapse of the indicated days. The symbol "c" represents recognition of at least one crystal. The symbol "A" represents recognition of amorphous precipitated substances. No symbol represents recognition of no variation as long as observed.

Although the embodiment described above has the two cover sheets whose plane shapes are the same as the channel plate, the cover sheets may have smaller sizes. Namely, the first cover sheet 12 may have the smallest size sufficient to achieve an airtight seal over at least the openings of the protein solution inlets, the openings of the precipitant solution inlets, the openings of the vent holes and the openings of the gel inlets. In such a case, a plurality of cover sheets with smaller sizes are usable instead of a single cover sheet. Similarly, the second cover sheet 14 may have the smallest size sufficient to achieve an airtight seal over at least the openings of the channels exposed at the bottom surface of the channel plate. Also in such a case, a plurality of cover sheets with slender sizes are usable instead of a single cover sheet.

The two cover sheets 12 and 14 may be made of polyimide or polytetrafluoroethylene other than the polyethylene terephthalate described above.

What is claimed is:

1. A crystallization device for making crystals of a target material from a target material solution which contains the target material to be crystallized, the crystallization device comprising:
    A) a channel plate including:
        a) a flat body having a first surface and a second surface;
        b) at least one elongated channel formed in the body and having one side which extends in a longitudinal direction of the channel, the one side being exposed at the second surface;
        c) at least one target material solution inlet formed in the body and having one end which opens at the first surface and another end which communicates with a first end of the channel;
        d) at least one crystallizing solution inlet formed in the body and having one end which opens at the first surface and another end which communicates with a second end of the channel;
        e) at least one vent hole formed in the body and having one end which opens at the first surface and another end which communicates with the channel at a point between the first end and the second end of the channel; and
        f) at least one gel inlet formed in the body and having one end which opens at the first surface and another end which communicates with the channel at a point between the second end of the channel and the vent hole;
    B) at least one first cover sheet covering the first surface so as to achieve an airtight seal over at least an opening of the target material solution inlet, an opening of the crystallizing solution inlet, an opening of the vent hole and an opening of the gel inlet; and
    C) at least one second cover sheet which is transparent and flexible and covers the second surface so as to achieve an airtight seal over at least an opening of the one side of the channel;
    wherein the second cover sheet, which is flexible, is configured such that at least a segment thereof can be peeled off to expose at least one crystal which has formed in the channel; and
    wherein the crystallization device is configured such that the at least one crystal can be picked up from the channel after the at least one segment of the second cover sheet has been peeled off.

2. The device according to claim 1, wherein the channel plate and the first cover sheet are transparent.

3. The device according to claim 1, wherein the body is made of polydimethylsiloxane.

4. The device according to claim 1, wherein the second cover sheet is made of one selected from a group consisting of polyethylene terephthalate, polyimide and polytetrafluoroethylene.

5. The device according to claim 1,
    wherein the channel includes a broader passage and a narrower passage which is narrower in channel width than the broader passage, and
    wherein the gel inlet is arranged to communicate with the broader passage, and the vent hole is arranged to communicate with the narrower passage.

6. The device according to claim 1, wherein the channel plate includes:
    a plurality of channels including said at least one channel, each of said plurality of channels having one side which extends in a longitudinal direction of the channel, the one side being exposed at the second surface,
    a plurality of the target material solution inlets;
    a plurality of the crystallizing solution inlets;
    a plurality of the vent holes; and
    a plurality of the gel inlets;
    wherein the plurality of channels have different configurations from each other.

7. The device according to claim 6, wherein at least two of the plurality of channels have different channel lengths from each other.

8. The device according to claim 6, wherein at least one of the plurality of channels includes a branch portion which branches into two passages, and ends of the two passages are respectively in communication with two of the crystallizing solution inlets.

9. The device according to claim 6, wherein at least one of the plurality of channels is not in communication with any of the gel inlets, and at least one of the plurality of channels is in communication with one of the gel inlets.

10. The device according to claim 6, wherein at least one of the plurality of channels is not in communication with any of the gel inlets or vent holes, and at least one of the plurality of channels is in communication with both one of the gel inlets and one of the vent holes.

11. The device according to claim 6, wherein at least two of the plurality of channels are both in communication with a respective one of the gel inlets and a respective one of the vent holes, and are different in configuration with respect to a position of the vent hole relative to the gel inlet in the longitudinal direction of the channel.

12. The device according to claim 6, wherein at least two of the plurality of channels are both in communication with a respective one of the crystallizing solution inlets and a respective one of the vent holes, and are different in configuration with respect to a position of the vent hole relative to the crystallizing solution inlet in the longitudinal direction of the channel.

13. The device according to claim 6, wherein at least two of the plurality of channels are different in terms of being of uniform channel width or including a broader passage and a narrower passage that is narrower in channel width than the broader passage.

14. A crystallization device for making crystals of a target material from a target material solution which contains the target material to be crystallized, the crystallization device comprising:

A) a channel plate including:
- a) a flat body having a first surface and a second surface;
- b) at least one elongated channel formed in the body and having one side which extends in a longitudinal direction of the channel, the one side being exposed at the second surface;
- c) at least one target material solution inlet formed in the body and having one end which opens at the first surface and another end which communicates with a first end of the channel;
- d) at least one crystallizing solution inlet formed in the body and having one end which opens at the first surface and another end which communicates with a second end of the channel; and
- e) at least one vent hole formed in the body and having one end which opens at the first surface and another end which communicates with the channel at a point between the first end and the second end of the channel;

B) at least one first cover sheet covering the first surface so as to achieve an airtight seal over at least an opening of the target material solution inlet, an opening of the crystallizing solution inlet, and an opening of the vent hole; and C) at least one second cover sheet which is transparent and flexible and covers the second surface so as to achieve an airtight seal over at least an opening of the one side of the channel;

wherein the second cover sheet, which is flexible, is configured such that at least a segment thereof can be peeled off to expose at least one crystal which has formed in the channel; and wherein the crystallization device is configured such that the at least one crystal can be picked up from the channel after the at least one segment of the second cover sheet has been peeled off.

15. The device according to claim 14, wherein the channel plate and the first cover sheet are transparent.

16. The device according to claim 14, wherein the body is made of polydimethylsiloxane.

17. The device according to claim 14, wherein the second cover sheet is made of one selected from a group consisting of polyethylene terephthalate, polyimide and polytetrafluoroethylene.

18. The device according to claim 14,
wherein the channel includes a broader passage and a narrower passage which is narrower in channel width than the broader passage, and
wherein the vent hole is arranged to communicate with the narrower passage.

19. The device according to claim 14, wherein the channel plate includes:
a plurality of channels including said at least one channel, each of said plurality of channels having one side which extends in a longitudinal direction of the channel, the one side being exposed at the second surface, a plurality of the target material solution inlets;
a plurality of the crystallizing solution inlets; and
a plurality of the vent holes;
wherein the plurality of channels have different configurations from each other.

20. The device according to claim 19, wherein at least two of the plurality of channels have different channel lengths.

21. The device according to claim 19, wherein at least one of the plurality of channels includes a branch portion which branches into two passages, and ends of the two passages are respectively in communication with two of the crystallizing solution inlets.

22. The device according to claim 19, wherein at least one of the plurality of channels is not in communication with any of the vent holes, and at least one of the plurality of channels is in communication with one of the vent holes.

23. The device according to claim 19, wherein at least two of the plurality of channels are both in communication with a respective one of the crystallizing solution inlets and a respective one of the vent holes, and are different in configuration with respect to a position of the vent hole relative to the crystallizing solution inlet in the longitudinal direction of the channel.

24. The device according to claim 19, wherein at least two of the plurality of channels are different in terms of being of uniform channel width or including a broader passage and a narrower passage that is narrower in channel width than the broader passage.

* * * * *